United States Patent [19]

Genovese

[11] Patent Number: 5,300,962
[45] Date of Patent: Apr. 5, 1994

[54] COMPOUND OPTICS FOR A RASTER OUTPUT SCANNER IN AN ELECTROPHOTOGRAPHIC PRINTER

[75] Inventor: Frank C. Genovese, Fairport, N.Y.
[73] Assignee: Xerox Corporation, Stamford, Conn.
[21] Appl. No.: 929,859
[22] Filed: Aug. 17, 1992
[51] Int. Cl.$^5$ .............................................. G01D 9/42
[52] U.S. Cl. ..................................... 346/108; 346/160
[58] Field of Search ..................... 346/108, 157, 160

[56] References Cited

U.S. PATENT DOCUMENTS

| | | | |
|---|---|---|---|
| 4,019,186 | 4/1977 | Dressen et al. | 346/108 |
| 4,178,064 | 12/1979 | Mrdjen | 350/6.6 |
| 4,403,848 | 9/1983 | Snelling | 355/4 |
| 4,428,662 | 1/1984 | Day | 355/4 |
| 4,435,064 | 3/1984 | Tsukada et al. | 346/160 |
| 4,804,981 | 2/1989 | Prakash et al. | 346/160 |
| 4,823,151 | 4/1989 | Miura | 346/160 |
| 4,833,503 | 5/1989 | Snelling | 355/259 |
| 4,866,459 | 9/1989 | Tokita et al. | 346/108 |
| 4,973,989 | 11/1990 | Yamamoto | 346/108 |
| 4,979,849 | 12/1990 | Goddard et al. | 346/108 X |
| 5,006,704 | 4/1991 | Mochizuki et al. | 346/108 X |
| 5,063,292 | 11/1991 | Brueggemann | 250/236 |
| 5,072,244 | 12/1991 | Aoki et al. | 346/160 |
| 5,181,137 | 1/1993 | Koide | 346/108 X |

*Primary Examiner*—Benjamin R. Fuller
*Assistant Examiner*—Randy Gibson
*Attorney, Agent, or Firm*—R. Hutter

[57] ABSTRACT

A raster output scanner system for multi-color printing provides a plurality of independently-controllable, substantially parallel writing beams. A rotating polygon causes the writing beams to scan simultaneously. The parallel beams are then reflected by a multifacet mirror and redirected to various photoreceptor surfaces. Each writing beam comprises a set of converging sub-beams, the relative intensity of which is adjustable to effect small positional adjustments of the writing beam on the photoreceptor surfaces.

23 Claims, 7 Drawing Sheets

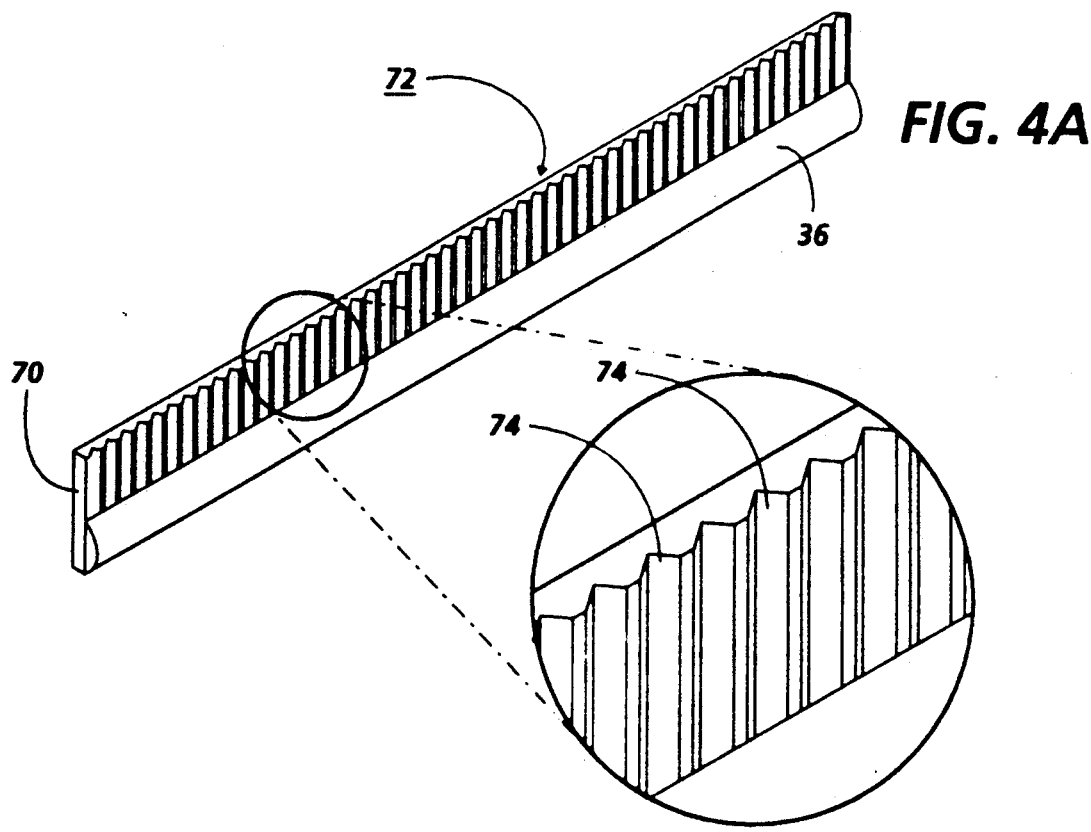
FIG. 4A
FIG. 4B
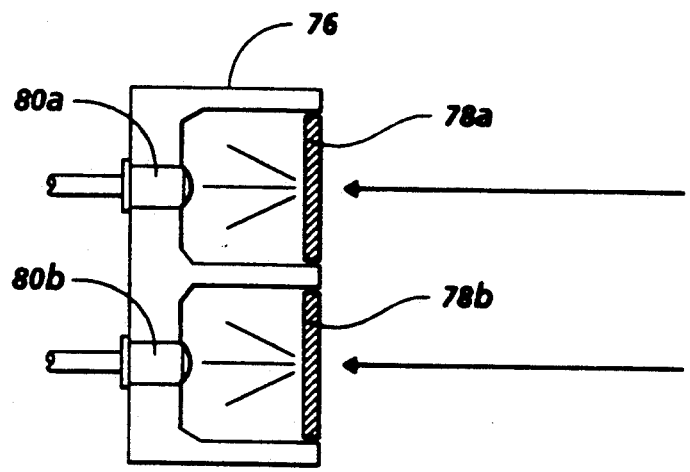
FIG. 5

COMPOUND OPTICS FOR A RASTER OUTPUT SCANNER IN AN ELECTROPHOTOGRAPHIC PRINTER

Cross-reference is made to the following co-pending U.S. patent applications, which are incorporated herein by reference: Ser. No. 07/850,737, entitled "Start-of-scan and End-of-scan Optical Element for a Raster Output Scanner in an Electrophotographic Printer;" and Ser. No. 07/862,154, entitled "Multiple-Spot Beam Control for a Raster Output Scanner in an Electrophotographic Printer."

The present invention relates to optics for a raster output scanner (ROS) for creating electrostatic latent images from electronically stored data in, for example, an electrophotographic printer. More specifically, the invention relates to an optical arrangement for a compact, low-error ROS system suitable for multicolor printing.

Electrophotographic printers wherein a laser scan line is projected onto a photoconductive surface are well known. In the case of laser printers, facsimile machines, and the like, it is common to employ a raster output scanner (ROS) as a source of signals to be imaged on a precharged photoreceptor (a photosensitive plate, belt, or drum) for purposes of xerographic printing. The ROS provides a laser beam which switches on and off according to digital image data associated with the desired image to be printed as the beam moves, or scans, across the photoreceptor. Commonly, the surface of the photoreceptor is selectively imagewise discharged by the laser in locations to be printed white, to form the desired image on the photoreceptor. The modulation of the beam to create the desired latent image on the photoreceptor is facilitated by digital electronic data controlling a modulator associated with the laser source. A common technique for effecting this scanning of the beam across the photoreceptor is to employ a rotating polygon surface; the laser beam from the ROS is reflected by the facets of the polygon, creating a scanning motion of the beam, which forms a scan line across the photoreceptor. A large number of scan lines on a photoreceptor together form a raster of the desired latent image. Once a latent image is formed on the photoreceptor, the latent image is subsequently developed with a toner, and the developed image is transferred to a copy sheet, as in the well-known process of xerography.

FIG. 9 shows the basic configuration of a scanning system used, for example, in an electrophotographic printer or facsimile machine. A laser source 10 produces a collimated laser beam, also referred to as a "writing beam," 12 which is reflected from the facets of a rotating polygon 14. Each facet of the polygon 14 in turn deflects the writing beam 12 to create an illuminated beam spot 16 on the pre-charged surface of photoreceptor 18. The system may further include additional optical elements such as focusing lenses 15. The energy of the beam spot 16 on a particular location on the surface of photoreceptor 18, corresponding to a picture element (pixel) in the desired image, discharges the surface for pixels of the desired image which are to be printed white. In locations having pixels which are to be printed black, the writing beam 12 is at the moment of scanning interrupted, such as by a modulator 11 controlled by imagewise digital data, so the location on the surface of photoreceptor 18 will not be discharged. It is to be understood that gray levels are typically imaged in like manner by utilizing exposure levels intermediate between the "on" and "off" levels. Thus, digital data input into laser source 10 is rendered line by line as an electrostatic latent image on the photoreceptor 18.

When the beam spot 16 is caused, by the rotation of polygon 14, to move across photoreceptor 18, a scan line 20 of selectively discharged areas results on photoreceptor 18. In FIG. 8, the photoreceptor 18 is shown as a rotating drum, but those skilled in the art will recognize that this general principle, and indeed the entire invention described herein, is applicable to situations wherein the photoreceptor is a flat plate, a moving belt, or any other configuration. The surface of photoreceptor 18, whether it is a belt or drum, moves in a process direction; the motion of spot 16 through each scan line 20 is transverse to the process direction. The periodic scanning of beam spot 16 across the moving photoreceptor 18 creates an array of scan lines 20, called a raster 22, on the photoreceptor 18, forming the desired image to be printed. One skilled in the art will appreciate that such a configuration will typically further include any number of lenses and mirrors to accommodate a specific design.

In a rotating-polygon scanning system, there is a practical limit to the rate at which digital information may be processed to create an electrostatic latent image on a photoreceptor. One practical constraint on the speed of a system is the maximum polygon rotation speed. It can be appreciated that high quality images require precision placement of the raster scan lines as well as exact timing to define the location of each picture element or pixel along each scan. In a conventional polygon scanner, this precision is achieved by holding very close mechanical tolerances on the polygon geometry and the rotational bearings supporting the polygon body and drive motor. Experience has shown that beyond about 20,000 RPM, precision ball bearings with the required closeness of fit have limited life and are impractical in many scanner applications. As a result, exotic alternatives such as air bearings are sometimes used, but these represent a substantial increase in engineering complexity and maintenance, and hence cost. Another constraint is the size of the polygon itself; it is clear that the forces associated with high speed rotation increase with the diameter of the object being rotated. In particular, both the stored energy and the gyroscopic forces that must be restrained by the bearings increase with the square of the diameter. It is therefore prudent to limit the polygon size to maximize bearing life as well as reduce the potential for damage should a bearing fail at high speed.

In addition to practical constraints, the speed of a printer must be considered in conjunction with other competing desirable characteristics of a printer, particularly resolution. In purely optical terms, there is a tradeoff between speed and resolution in a scanning system. The higher the resolution, that is, the more pixels that are designed to form a latent image of a given size, the lower the numerical aperture of the optical system required in order to define the pixels accurately. This trade off can be summarized by a derived equation for an underfilled system relating the angular velocity $\omega$ of a polygon having a mean diameter D to the desired pixel size (that is, the inverse of resolution) $\Delta x$:

$$D\omega^2 = [L\lambda F^2/\Delta x^3][(60/\pi)^2 k/2][E/\chi]$$

The other variables in this equation are as follows: L is the length of the intended scan path, which in this context is the width of the photoreceptor across which the scan line is formed. P is the process speed, in inches per second, of the photoreceptor motion in the machine. k is a constant which depends on the intensity profile of the beam (for example, under a certain convention, the usable pixel size is dependent on a focused concentration where 86% of the total power of the beam is focused within a circular area of a given size). E is an efficiency factor relating to the proportion of the "circumference" of the polygon which is practically usable for scanning purposes; i.e., because the numerical aperture for a given resolution $\Delta x$ requires a specific beam width at the polygon, the beam will not be reflected usefully for a certain portion of the time when the beam is focused near the ends of the facets of the polygon. The larger the ratio of facet length to beam width, the larger the proportion of the polygon rotation which is usable for scanning purposes. $\chi$ is the ratio of reflected scan angle to rotational scan angle, which depends on whether the facets of the polygon are parallel or oriented at 45 degrees to the axis of the polygon. If the facets are parallel, as in the illustrated case, then $\chi$ is equal to 2. There are some designs in which the facets of the polygon are set at 45° relative to the axis so that the polygon has the general appearance of a truncated cone. In that case, the beam from the source is incident on the facets parallel to the axis of the polygon, and is reflected in a direction perpendicular to the axis; for this geometry, $\chi$ is equal to 1.

Looking at the most important system design variables in the above equation, the scan length L, the process speed P, and the spot size $\Delta x$, it is clear that the desire for a longer scan, faster throughput, and higher quality image (smaller spot size) all increase the value of the right hand size of the equation and are at cross-purposes with the need to keep the left hand side of the equation, representing the demands on the polygon, as small as possible. As a practical matter, it has been discovered that for electrostatographic printers, the largest practical polygon from a cost and safety standpoint is one having a diameter of about five inches, although diameters of about two inches are generally preferred from a standpoint of machine compactness. Simultaneously, system cost and engineering difficulties are rapidly compounded at rotational speeds of more than 20,000 rpm. The above equation, it should be remembered, has been derived strictly on the basis of optical laws and without consideration of practical limitations. There is, therefore, a distinct advantage in any arrangement which facilitates a substantial increase in the possible rate of digital data that may be imaged with a scanning apparatus, thereby providing the possibility of enhanced resolution, increased scan length, or faster process speed, in various proportions without violating the necessary relationship defined in the equation.

The engineering challenge in the design of a raster output scanning apparatus is compounded in the case of color apparatus. In a full-color printing apparatus, superimposed images must be processed for each of three primary colors and black. Thus, the amount of digital data required to create a latent color image of a given area and pixel size is necessarily quadrupled. Even in cases where digital data corresponding to the different primary colors is simply scanned with four separate polygons, obvious problems of synchronization are created, and even if that problem is circumvented, there will be obvious problems of increased power consumption, as well as duplication of components which are typically expensive and painstakingly aligned. To this must be added the additional hardware sensors and software that might be necessary to maintain precision mechanical registration with a multiplicity of rotating polygons.

U.S. Pat. No. 4,178,064 discloses one possible type of timing correction system for use in the placement of image data on a photoreceptor, in which a pilot beam reflecting from the same area of the same facet as the beam writing the image is used to detect and compensate anomalies in the position or velocity of the scanned line through variable data timing.

U.S. Pat. No. 4,403,848 discloses an electronic color printing system wherein beams from a common source are split into parallel beams, each parallel beam is modulated according to digital data associated with one component color of the desired image, and then the beams are deflected to discharge spaced-apart portions of a belt photoreceptor. The discharged area of one color is developed prior to the image writing of the second color on the belt. U.S. Pat. No. 4,833,503 discloses a sonic toner-release development system suitable for use in conjunction with this architecture.

U.S. Pat. No. 4,428,662 discloses a light-lens color copier in which an original document is imaged multiple times through a sequence of color filters on a rotatable color wheel, and each such filtered image is made to sequentially expose one of two belt photoreceptors. Each photoreceptor is developable by one of two developing stations, one each for the primary colors and black. The developed images from the two photoreceptors are then superimposed on a copy sheet.

U.S. Pat. No. 4,804,981 and U.S. Pat. No. 4,866,459 disclose various types of shaped optical elements designed to correct optical and geometrical errors typically associated with ROS systems.

U.S. Pat. No. 5,063,292 shows an optical system for a ROS scanner wherein the laser from the source is twice reflected by a facet of the polygon, passed through a cylindrical lens to focus the beam in the scan plane, and is then reflected by a cylindrical mirror to focus the beam in a cross-scan plane.

U.S. Pat. No. 5,072,244 discloses a full-color ROS printer in which scanning beams from four separate rotating polygons are focused on four respective drum photoreceptors arranged along an intermediate belt or web.

According to one aspect of the present invention, there is provided a system for the substantially simultaneous creation of latent electrostatic latent images on a photosensitive surface. A compound source provides a plurality of substantially parallel light beams, each light beam being independently controllable in accordance with imagewise data. Each writing beam is in the form of a plurality of generally converging sub-beams, and means are provided for regulating the relative intensity of at least a subset of the sub-beams within each writing beam. Means are provided for directing each light beam toward the photosensitive surface.

In the drawings:

FIG. 4A is an elevational view of a combined cylindrical lens and grating which may be used in conjunction with the optical system of the present invention;

FIG. 4B is an exploded view of a portion of the optical pattern of FIG. 4A;

FIG. 5 is an elevational view of a detector for a pilot beam system which may be used in conjunction with the optical system of the present invention;

In the Figures, like reference numerals indicate like elements, whether in physical views or schematic diagrams.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
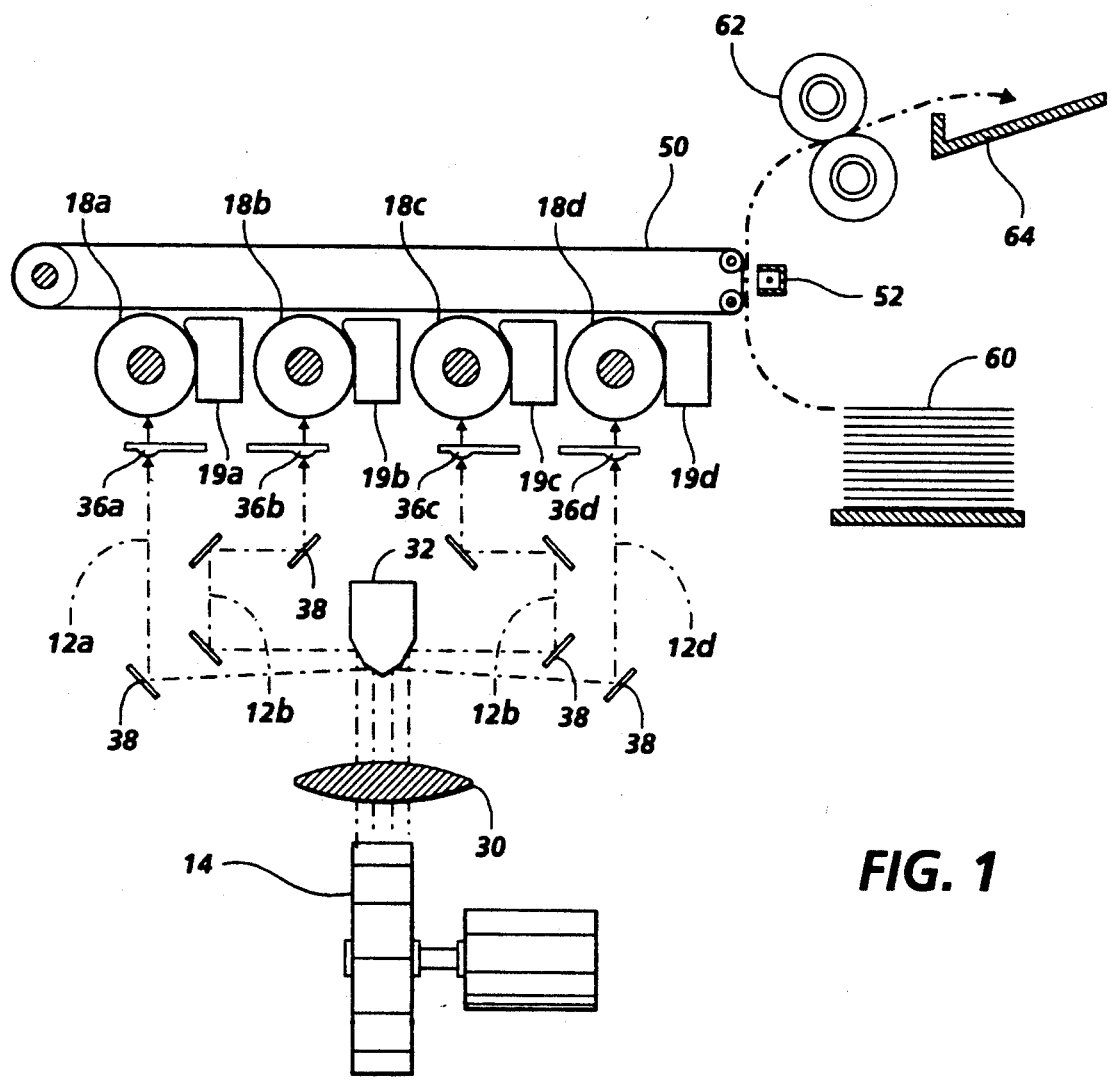
FIG. 1 is an elevational view of the optical system of the present invention.

FIG. 1 shows an arrangement of optical elements for full-color electrostatic printing from a source of digital data, according to the present invention. In general, what is shown is a full-color xerographic printer having "tandem architecture," with four separate drum photoreceptors, each developable with a separate primary color, wherein the developed images on each photoreceptor are sequentially transferred to an intermediate belt, and wherein the superimposed toner image on the intermediate belt is then transferred to a sheet (as a sheet of paper) to form the finished print. It is to be understood that the concepts being described herein apply equally well to an architectural variation of this arrangement in which the developed images on each photoreceptor are sequentially transferred and are superimposed directly on the copy sheet forming the finished print, as well as alternative machine designs in which the superposition of toner images takes place directly on a photosensitive member.

Figure 9:
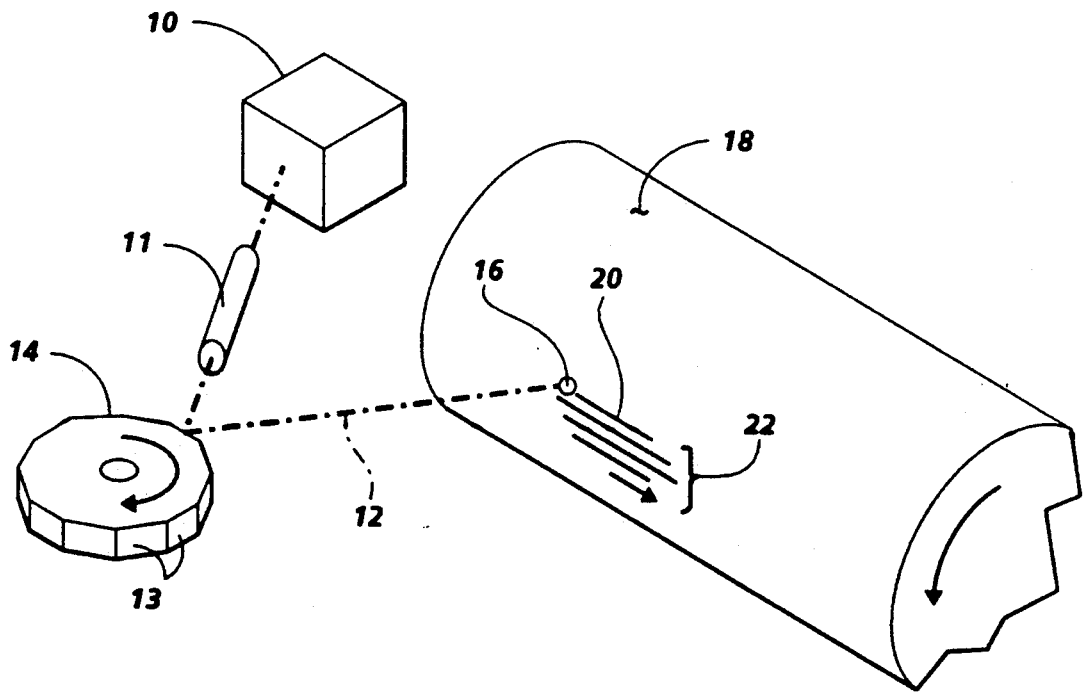
FIG. 9 is a simplified elevational view showing the basic elements of a raster output scanner.

Looking first at the drum photoreceptors marked 18a–d, each drum photoreceptor is identical in function to the drum photoreceptor marked 18 in FIG. 9. Each photoreceptor 18a–d accepts exposure thereon in the form of a raster of scan lines creating an electrostatic latent image on the photoreceptor. Because each photoreceptor 18a–d is fitted with a development system for one primary color, it follows that the digital data controlling the exposure of each photoreceptor corresponds to the latent image of that primary color in the image to be printed. For example, the yellow-processing photoreceptor will receive only image data corresponding to the yellow component of the image to be printed, and will therefore be developed with toner particles having a yellow color. The same principle applies to the magenta, cyan, and black components, each of which is separately generated on a dedicated photoreceptor drum.

Each photoreceptor drum 18a–d has associated therewith a developer housing 19a–d, each individual developer housing containing therein a quantity of toner of the appropriate color. It will be understood that any type of developing apparatus that is practically suitable for the particular architecture of the system may be used, whether a single component system, a magnetic brush system, a touchdown development system, or any other known type of development system, as would be apparent to one skilled in the art. Each developer housing 19a–d develops the latent image on the photoreceptor as the photoreceptor rotates past the developer housing. As a developed area on each photoreceptor proceeds further, the toner that has been triboelectrically adhered to the charged areas on the photoreceptor comes in intimate contact with an intermediate belt 50. The purpose of the intermediate belt 50 is to accept thereon the toner, in imagewise fashion, from each of the individual photoreceptors 18a–d, such that each successive image associated with each primary color and black are precisely superimposed on a single surface to form a complete full-color image. A typical material for intermediate belt 50 is polyamide or polyurethane. Once the complete full-color image, including, as necessary, all of the types of toner from each developed photoreceptor 18a–d is completed, intermediate belt 50 is advanced to a transfer station shown generally as 52, where a sheet, such as a sheet of paper from stack 60, is positioned in contact with the full-color toner image on intermediate belt 50 so that the toner image may be accurately transferred to the sheet. This transfer from intermediate 50 to the sheet may be accomplished by any number of known means, either by electrostatic means, pressure means, or by contact alone. Once the quantity of toner in image-wise fashion is applied to the sheet, the sheet is then sent through a fusing apparatus such as fuser rolls 62, in accordance with the well-known xerographic process, to fuse the toner onto the sheet to form a permanent image. The sheet with the fused image thereon, is then deposited in, for example, catch tray 64. A cleaning unit (not shown) may be further employed along the intermediate belt 50 downstream of the transfer station 52, to remove any excess or left over toner from the intermediate belt 50 so that subsequent toner images may be processed on an uncontaminated surface on belt 50.

Turning now to the optical portion of the apparatus shown in FIG. 1, there is shown the rotating polygon 14, having a function of reflecting a collimated laser beam from a source (not shown) in order to create a scan line path into the page of FIG. 1. Thus, in the present case, instead of having only a single collimated laser beam reflected sequentially by the facets of polygon 14, four substantially parallel writing beams, shown as 12a–d, are simultaneously reflected by the various facets of polygon 14, in order to create separate and distinct scan lines for the four writing beams 12a–d simultaneously. Once the beams are redirected by the facets of polygon 14, the beams pass through a single projection lens 30. Projection lens 30 may be of the typical Ftanθ variety and is mounted sufficiently close to the polygon 14 such that the entire scanning range of the beams 12a–d remain within its useful optical aperture. The purpose of projection lens 30 is to focus all of the beams 12a–d simultaneously on respective photoreceptors 18a–d, as will be described in detail below.

Substantially adjacent projection lens 30 is a multi-faceted mirror 32. In the preferred embodiment, multi-faceted mirror 32 is in the form of a single "barn-shaped" reflective member, having, as shown, an arrangement of facets arranged to cause each individual writing beam 12a–d to diverge away from the others. As shown, the multi-faceted mirror 32 reflects beam pair 12a and 12b in substantially one direction, and beam pair 12c and 12d in substantially the opposite direction, while each beam pair diverges at a small angle. The diverged beams 12a–d are respectively directed to a series of cylindrical lenses 36a–d, where they are in turn caused to focus in known manner to form beam spots, scan lines, and image rasters on the respective photoreceptors 18a–d. A system of mirrors, generally shown as 38, may be provided as needed in order to maintain the path length of all of the beams 12a–d between polygon 14 and photoreceptors 18a–d to be substantially but not necessarily exactly equal for each beam. If the focal lengths of the beams are substantially equal, then a single projection lens 30 may be used for all of the beams 12a–d. Various alternate schemes for maintaining this substantially equal focal length will be apparent to one skilled in the art.

Cylindrical lenses 36a–d are provided to ensure proper definition and placement of beam spots from writing beams 12a–d on the respective photoreceptors 18a–d. As used in the specification and claims herein, the phrase "cylindrical lens" is defined as an optical element having optical power substantially only along one direction. In the present context, such a cylindrical lens such as 36a–d will extend across the width of the associated photoreceptor 18a–d, that is, along the line extending into the page in FIG. 1. Examples of suitable cylindrical lenses are shown, for example, in U.S. Pat. No. 4,804,981, or U.S. Pat. No. 4,866,459. U.S. patent application Ser. No. 07/862,154 also describes the use of a cylindrical lens to compensate for small geometrical errors commonly found with rotating polygons, particularly "wobble."

Figure 2:
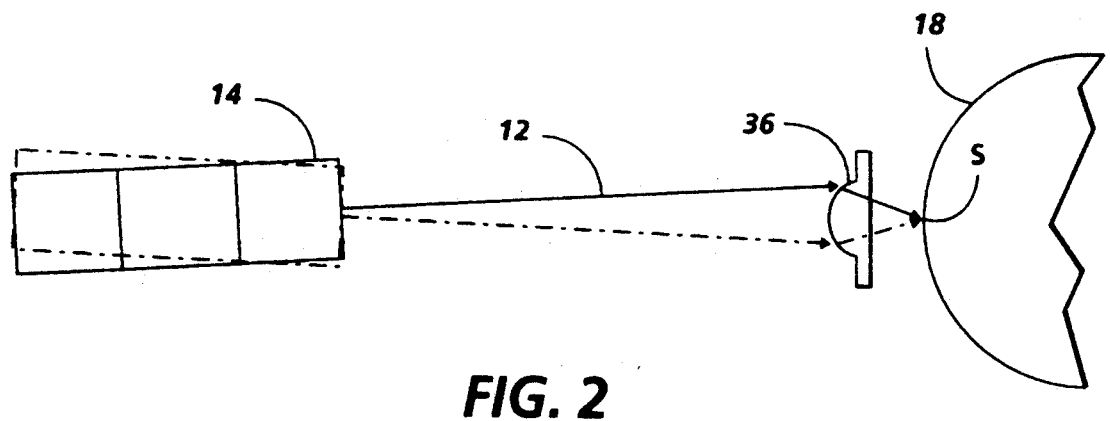
FIG. 2 is a plan view of a rotating polygon and an associated beam being scanned on the surface of a photoreceptor, illustrating an optical principle relevant to the present invention.

FIG. 2 illustrates the function of a cylindrical lens 36 (which may represent any cylindrical lens 36a–d in the system of FIG. 1) in a raster output scanner. The curvature and position of a cylindrical lens such as 36 is arranged so that divergent light from a fixed point on a facet of polygon 14 will be caused to converge at the surface of photoreceptor 18 to form spot 16. In this configuration, the object distance L, that is the effective optical distance between the cylindrical lens and the polygon 14, and the image distance F, that is the distance between the cylindrical lens and the surface of the photoreceptor, are arranged to be the optical conjugates of the cylinder lens 36. In the preferred embodiment, the object distance of the cylindrical lens is very large compared to the image distance, so that the ratio L/F preferably creates approximately a 30:1 reduction.

When the polygon 14 is rotated to create repetitive scan lines at a relatively high speed, each facet of the polygon 14 may have a slightly different orientation with respect to the rotational axis, a condition commonly referred to as facet signature. Additionally, the polygon body may not be mounted on the rotating shaft perfectly symmetrically, or the rotational axis of the polygon shaft can precess in the shaft bearings under the influence of gyroscopic forces. The effect of these errors in various small proportions are equivalent to a mechanical wobble as the polygon rotates, as shown by the phantom polygon 14 in FIG. 2. Ordinarily, such a wobble would have the effect of misplacing the spot placed on a photoreceptor by the reflection of a beam from a facet of polygon 14. However, the effect of a cylindrical lens 36, when so arranged in the system, is to counteract the small angular errors in the geometry of the polygon 14 so that the resulting beams passing from polygon 14 along slightly different paths through a suitably positioned lens 36 will be caused to converge toward a common locus on the optical axis of lens 36 such that all spots are formed on photoreceptor 18 on a common line parallel to the body of the cylindrical lens, regardless of where the beam path actually passes through the lens. It will be understood by those practiced in the art that the optimum shape of such a cylindrical lens 36a–d may deviate very slightly in cross-section from a perfectly circular arc, and the net optical power of such a cylindrical lens may optimally be slightly different at different points along its length so that it is, strictly speaking, a generalized optical surface rather than an exact cylindrical figure.

Because, in the present invention, four independently-controllable beams 12a–d reflect from the same facet of polygon 14 simultaneously, it becomes crucial that positional errors, either in the beams themselves or in the motion of each photoreceptor 18a–d, be compensated for in order to perfect not only the placement of raster lines in the form of the desired image on the respective photoreceptors, but also to ensure proper registration of the multiple developed images transferred from the photoreceptor surfaces 18 to the intermediate belt 50. Because, in the present invention, each independent photoreceptor 18a–d may be provided with its own cylindrical lens 36a–d, each raster formed on the photoreceptors may be independently regulated regardless of the particular causes of imperfections in the quality of motion of each photoreceptor 18a–d and the placement of scan lines thereon, such as are associated with mechanical strains and vibrations found in typical machine environments.

At the same time, because the four composite beams 12a–d are caused to reflect from the same facet of the same polygon simultaneously, imperfections in the scan caused by the polygon 14, including "facet signature," will be minimized. "Facet signature" is the condition that arises when one or more individual facets on a polygon contain a slight imperfection which causes a cyclical imperfection of the scan every time that particular facet is used. The independent cylindrical lenses 36a–d can be used to substantially minimize the scan line placement error associated with facet signature, but in addition, the source of such error, the polygon 14, is limited in the extent of error propagation possible, because there is only one polygon and all four beams are reflected from one facet thereof simultaneously. In contrast, a system such as that described in U.S. Pat. No. 5,072,244 shows a four-color tandem architecture in which each color has its own source and its own polygon associated therewith. With four polygons, the relative color-to-color scan line placement errors caused by "facet signature" occurring due to the use of four separate polygons, each with similar uncoordinated imperfections is quadrupled, and in addition, critical registration problems associated with coordinating the motion of all four polygons come into play, which are absent when a single polygon can be employed for all beams simultaneously. The single polygon technique of the present invention, therefore, serves to minimize the propagation of beam placement errors associated with the rotating polygon components in a multiple beam system.

Co-pending patent application Ser. No. 07/850,737, incorporated herein by reference, discloses a system for use in conjunction with a ROS scanning system wherein the placement of digital image data along a scan line is controlled by means of creating clock pulses with optical patterns formed on a substrate adjacent the photoreceptor. Basically, precision optical patterns adjacent the photoreceptor can be exploited to control the timing of digital data modulating the beam source so that the resulting exposure and subsequent developed pixel for each data point is placed exactly in its proper position along the scan line on the photoreceptor surface. A similar concept is disclosed in U.S. Pat. No. 4,178,064, assigned to the assignee of the present invention. In this patent, a similar type of position correlated data timing method is used in a scanning system by providing, in addition to the actual writing beam which exposes the photoreceptor, a pilot beam that reflects from the same facet surface but is oriented in a slightly different direction so that the pilot beam strikes a strategically located grating target. Periodic modulation of the pilot beam by alternating absorbing and reflecting (or transmitting) areas in the grating target can be sensed to provide an accurate position sensitive output signal which is then used to time the data for each point of the image along the scan line on the photoreceptor.

Figure 3:
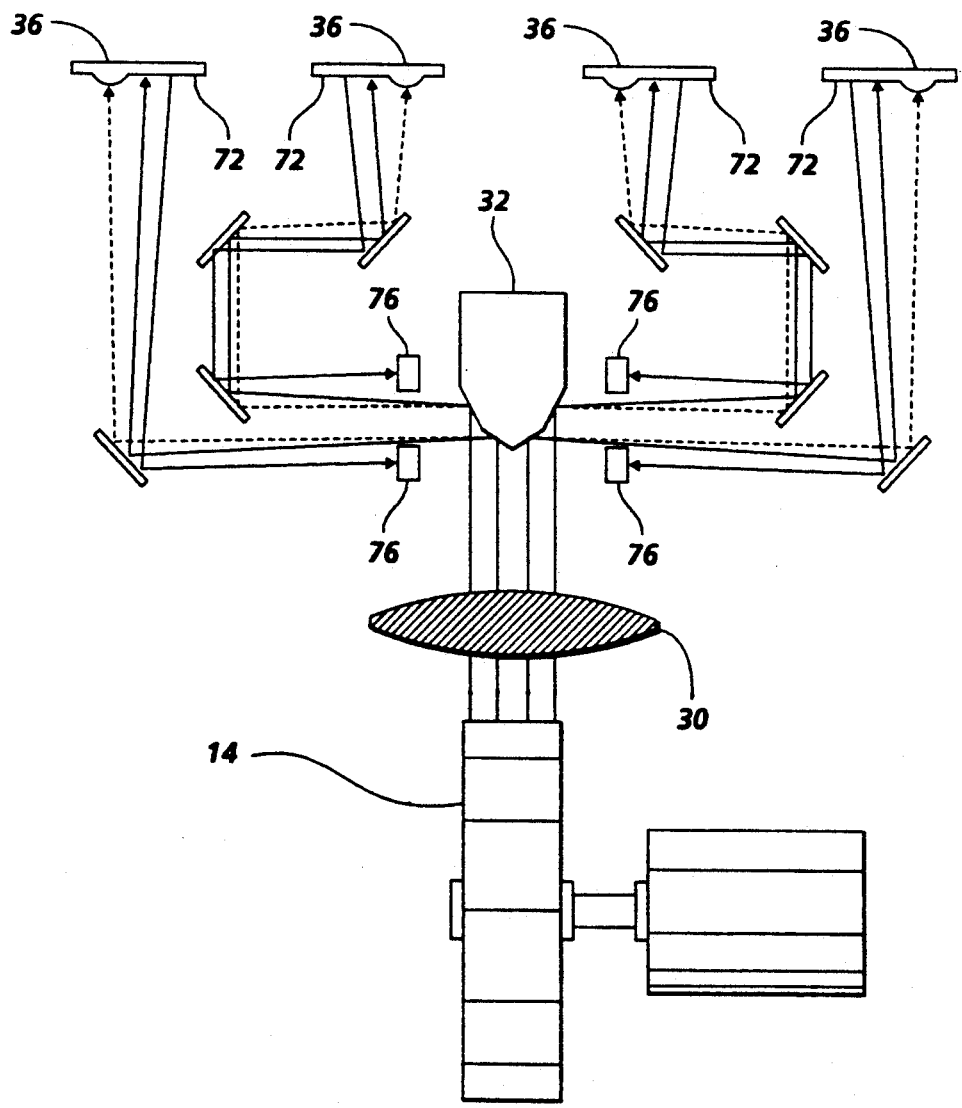
FIG. 3 is an elevational view of a modified version of the optical system of the present invention.

In FIG. 3 is shown a system wherein an optical grating associated with each of the cylindrical lenses 36a-d is provided for independent real-time control of the placement of image data on each of four photoreceptors 18a-d simultaneously. In the system shown in FIG. 3, there is provided from a second source (not shown) means for projecting from the same surface areas on the facets of polygon 14, a series of pilot beams which are intended to be directed to optical grating targets directly adjacent the respective cylindrical lenses. In FIG. 3, the paths of beams intended for image creation and directed to the actual cylindrical lenses are shown broken, while the pilot beams are shown as solid lines and directed to the optical targets adjacent the cylindrical lenses.

FIG. 4 shows an adaptation of one cylindrical lens 36 (of the plurality of the cylindrical lenses 36a-d), rigidly affixed to a substrate 70, with an optical pattern 72 etched or otherwise formed thereon. As shown in the detail of FIG. 4, in the preferred embodiment the optical pattern 72 is a repetitive series of optically passive structures 74 which, when a small beam of light, such as a pilot beam, is incident thereon, will reflect the beam either in one direction or in a slightly different direction, depending on the point of incidence of the pilot beam. Thus, if a small pilot beam is caused to scan across patterned target area of substrate 70, much in the manner of the writing beam 12 forming the image and passing through cylindrical lens 36, a repetitive spatially modulated optical reflection will be generated with the reflected pilot beam alternating the direction of its reflection in a repetitive fashion. The period of the direction changes will therefore be a direct result of the actual behavior of the pilot beam (in the sense of velocity and position) which can be made to be identical to that of the writing beam 12 creating the image, both the pilot beam and the writing beam 12 having been arranged to reflect from the same point on the same facet of polygon 14.

Returning to FIG. 3, it can be seen that the reflected beams from optical patterns 72, shown as a solid arrow pointing away from the optical pattern 72, can be refocused to the corresponding one of a plurality of detectors 76. FIG. 5 is a detailed view of one such detector 76. Preferably, each detector 76 includes means for accepting the light directed from optical pattern 72, whether the beam has been reflected in a first direction or in the second direction.

To this end, the detector 76, shown in detail in FIG. 5, includes two diffusing screens 78a and 78b, spatially separated from one another, and having respectively behind them photodetectors 80a and 80b. The photodetector portion 80a is arranged to detect the beam directed from optical pattern 72 in a first direction, and detector portion 80b is arranged to detect the beam directed from optical pattern 72 in the second direction. Thus, when the pilot beam is caused to scan across the optical pattern 72, an alternating pattern of intensity will enter detector 76 causing an alternating electrical response in photodetectors 80a and 80b. The two electrical output signals can then be compared to provide a real-time clock for the modulation of the writing beams 12 creating the latent image on the particular photoreceptor. It will be appreciated that a solid state light detector, as shown in FIG. 5, has a maximum operating speed for responding to an alternating input light intensity. It is generally known to those skilled in the electronics art that in typical circuit configurations, that the response speed of such solid state detectors tends to vary in inverse proportion to their active light detection area because of intrinsic internal junction capacitance. It is therefore critical that the detector be as small as practicable in order to maximize the speed of response. As an example of the speed requirement demanded in high quality electrostatographic applications, a 10 inch scan length of 600 spots per inch with an imaging speed of 10 inches per second (6000 scans per second) requires a nominal response time of less than 28 nanoseconds (0.000000028 sec.) when individual clock pulses are to be directly generated for each scanned pixel. It will also be appreciated by those familiar with the art, that the function of the diffusion screens 78 in FIG. 5 is to form an integrating optical cavity in order to more reliably link the solid state detector, having been selected with a small sensitive area for high speed response, with the relatively unfocused and variously directed light flux from optical pattern 72.

While a simpler version of the above feedback system might consist of a single solid state detector 80 and a single on-and-off beam wherein the optical pattern 72 is simply a pattern of alternating reflecting and absorbing areas, the two-photodetector system is preferable because of superior accuracy and reliability in an environment of background illumination and common mode beam intensity changes.

Figures 6A, 6B:
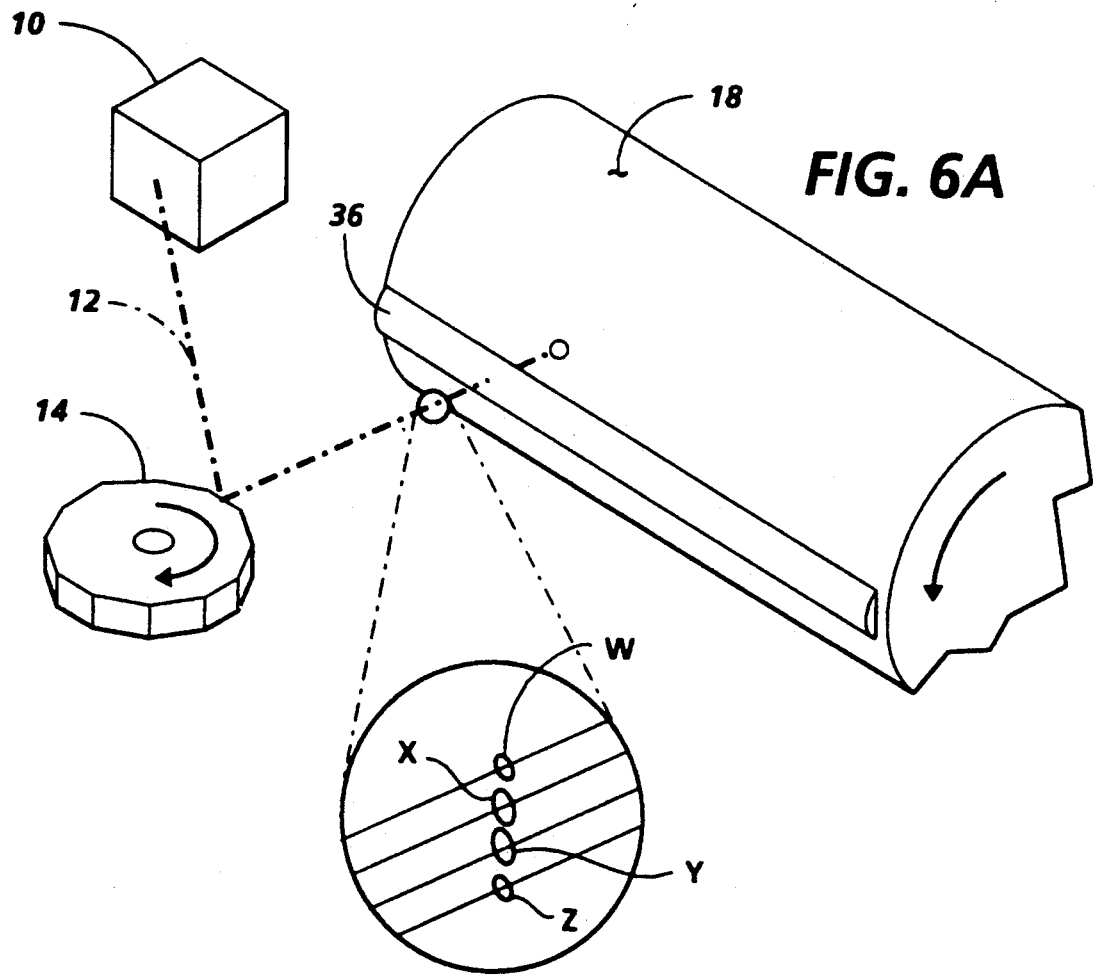
FIG. 6A is an elevational view showing the principle of a scanning correction system which may be used in conjunction with the optical system of the present invention.
FIG. 6B is an exploded elevational view showing the configuration of sub-beams according to one embodiment of the present invention.
Figure 6C:
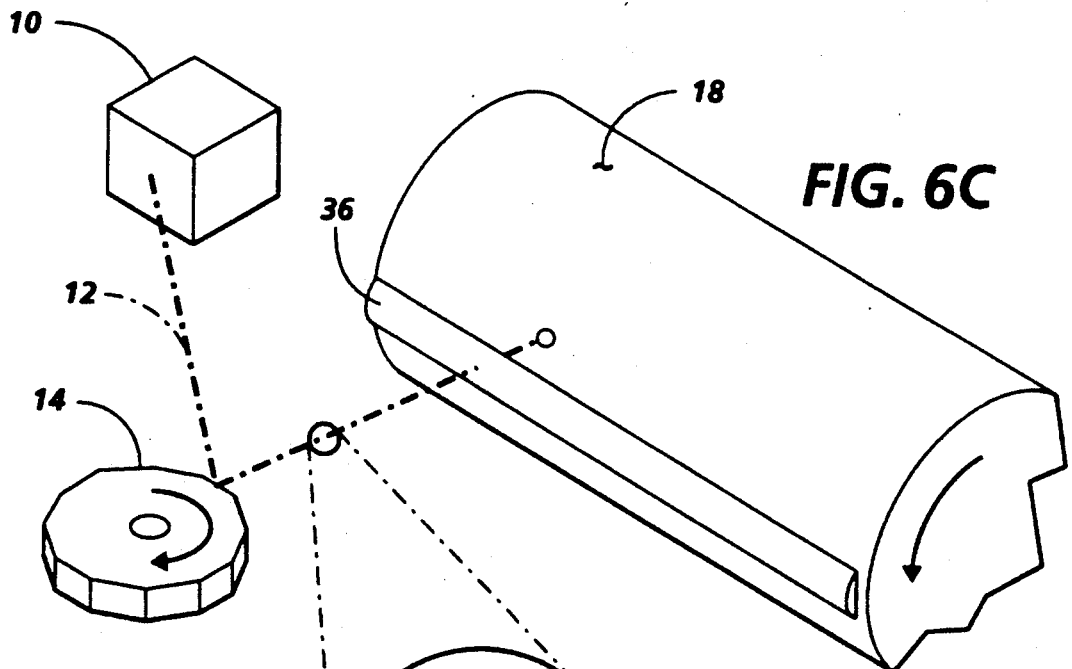
FIG. 6C is an elevational view showing a the principle of an alternate scanning correction system which may be used in conjunction with the optical system of the present invention.
Figure 6D:
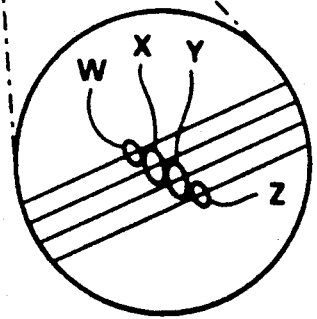
FIG. 6D is an exploded elevational view of the configuration of sub-beams in the alternate scanning correction system shown in FIG. 6C.

Co-pending patent application Ser. No. 07/862,154, incorporated herein by reference, assigned to the assignee of the present application, and entitled "Multiple-Spot Beam Control for a Raster Output Scanner in an Electrophotographic Printer," discloses a system in which each individual beam, such as writing beam 12 in the above examples, itself comprises of a plurality of converging beams all focused on the same general area on the photoreceptor. A plurality of converging sub-beams, such as four sub-beams, are arranged in a line which may be aligned with or perpendicular to the scan direction of a writing beam moving across the photoreceptor 18. Of these four converging sub-beams in a line, the outermost sub-beams of the group (the "end beams") will be complimentarily variable in intensity; i.e., an increase in the intensity of one end beam will be matched by a corresponding decrease in the intensity of the opposite end beam. This complimentarity can be used to make minute variations in the intensity of different portions of the composite spot on the photoreceptor being exposed, such that the resulting area defining the profile of the exposed pixel can be adjustably positioned on the photoreceptor surface with great precision. As stated in the above-mentioned patent application, this "beam steering" is useful in correcting, for example, detected imperfections and anomalies in the movement of the photoreceptor drum. FIG. 6A shows how such a multi-spot system can be incorporated for error correction in a direction at right angles to the scan path, i.e., to compensate for errors in the motion quality of the drum 18. For clarity the system is shown for only a single photoreceptor, but it will be appreciated that, in the preferred embodiment, the arrangement will apply to all of the photoreceptors 18a–d individually. If the writing beam 12 is examined closely at a point near the photoreceptor surface 18, as shown in the detail, it will be seen that four sub-beams w, x, y, and z are arranged in a line at right angles to the scan path. The four beams scan in parallel and are always equidistant. However, the beams forming the sub-beams w, x, y, z are convergent in such a way that they together form a single well defined pixel at the surface of photoreceptor 18. Adjusting the relative intensities of the end beams w and z effectively moves the "centroid" or net position of the exposed spot 16, and this positional adjustability may be used for mechanical and optical error correction.

Figure 7:
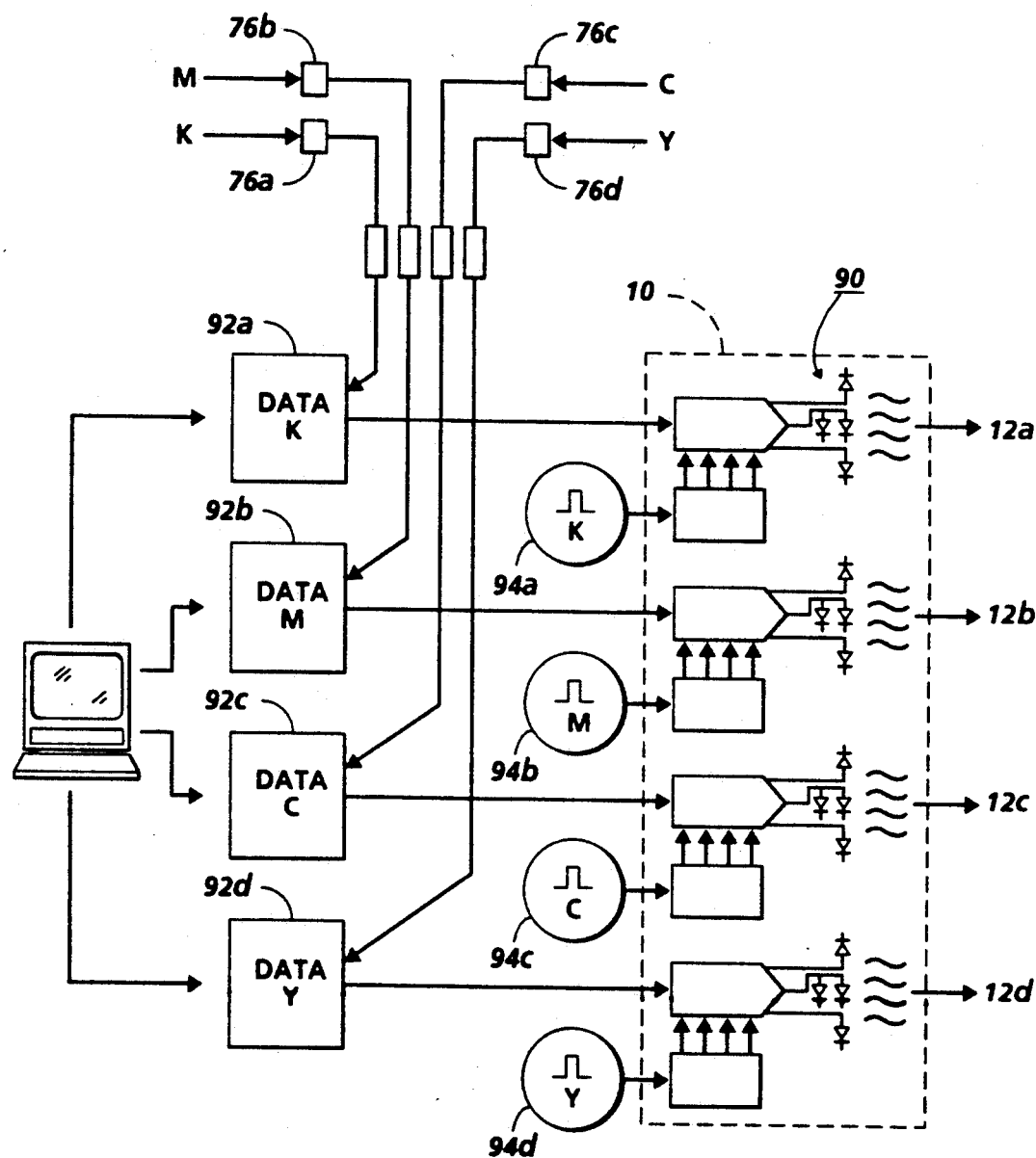
FIG. 7 is a systems diagram of the scanning correction system of FIG. 6A.

FIG. 7 is a block diagram of such a system incorporated into the present invention. Here, it can be seen that each of the four writing beams 12a–d are created by the convergence of sub-beams from four adjacent diode sources such as those indicated as 90. These four converging sub-beams from the four converging diodes in this group can be manipulated for compensatory steering in response to detected anomalies in the motion of the corresponding photoreceptor, as derived by suitable processing of individual photoreceptor motion signals 94a–d shown as encoder pulses in FIG. 7, and combinatorially in response to the precise position of the spots along the scan line as indicated by the timing pulse train from optical detectors 76a–d. Information about the real-time motion of each photoreceptor 18a–d may be gathered from, for example, an encoder roll system associated with each photoreceptor, the encoder information being compared with the output from a fixed clock pulse. The differences in the encoder output from a given photoreceptor and the fixed clock pulses are then used to control the extent of beam steering for a given photoreceptor at a given moment. Thus, anomalies in the motion of each of the photoreceptors 18a–d can be compensated for to insure consistently placed scan lines thereon, in the manner described in detail in the above-referenced case.

In the case of steering the various beams to compensate for error in photoreceptor motion, the four beams would be arranged in a line parallel with the process direction of the photoreceptor, as shown in FIG. 6A. It should be clear that such a multi-spot system can also be incorporated for error correction along the scan path, i.e., to compensate for errors in the motion quality of the polygon 14 if so desired. The arrangement of sub-beams w, x, y, z for error correction along the scan path is shown in FIG. 6B, which is equivalent to the detail in FIG. 6A, except that the sub-beams are arranged along a line parallel to the scan path, whereas in FIG. 6A the sub-beams are arranged along a line parallel to the process direction of the photoreceptor. In either case, the beam-steering principle, as described in U.S. patent application Ser. No. 07/862,154, is the same: detected anomalies in the motion of the beam spot relative to the photoreceptor are detected and compensated for by adjustment of the relative intensity of the diodes 90, causing the converging beams for each spot to be spatially adjusted. Beam steering in the scan direction may be useful in, for example, adjusting the position of the beam to compensate for errors caused by nonlinearities between the angle of the beam at a given portion of the scan and the position of the spot caused by the Ftan$\theta$ principle of the projection lens 30. Such beam-steering in the fast-scan direction may also be useful in writing data for a plurality of adjacent pixels in a scan line, e.g. providing numerous sub-beams to enable the simultaneous writing of five adjacent pixels while the actual, relatively large writing beam moves relative thereto. While the writing beam, which is itself large enough to encompass five pixel areas in a scan line, moves, the light to be directed to a specific pixel area may "stay in one place" by virtue of the sub-beam system, thus enabling an extension of exposure times for each pixel area without a decrease in the speed of the writing beam moving across the photoreceptor. This system would also serve to minimize the "smudge" caused when a modulated beam does not switch on and off cleanly while it scans across the photoreceptor, causing a tapering of the exposed area along the fast-scan direction. Because of the longer exposure time afforded by the writing of multiple adjacent pixels in the fast-scan direction, cleaner transitions between print-white and print-black areas may be made.

Figure 8:
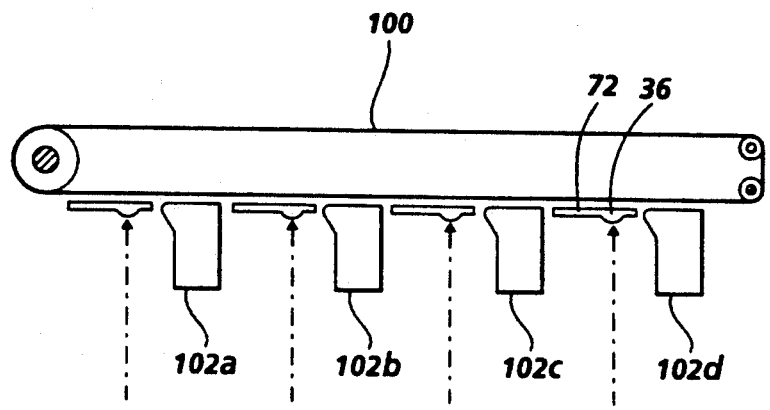
FIG. 8 is an elevational view of a portion of an alternate embodiment of the present invention.

FIG. 8 shows an alternate embodiment of the present invention, in which instead of providing for individual photoreceptors transferring the toner associated with the developed images thereon onto an intermediate, the beams 12a–d are scanned directly onto a belt photoreceptor which is successively developed with toners of different colors. Obviously, in order to create the necessary superimposition of developed images on the belt photoreceptor 100, it will be necessary to control the distribution of digital image data to the various areas on the photoreceptor adjacent each developer housing 102a–d, in a manner functionally equivalent to the case for the drum architecture illustrated in FIG. 1, which will be apparent to one skilled in the art.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A system for substantially simultaneously creating a plurality of electrostatic latent images on a photosensitive surface, comprising:

means for creating a plurality of substantially parallel writing beams, each of said writing beams being in a form of a plurality of substantially converging sub-beams, the sub-beams of each of said writing beams being arranged to overlap each other along a line, the overlapping sub-beams forming a centroid on the photosensitive surface, said creating means including means for modulating each of said writing beams independently according to imagewise data, and means for regulating a position of the centroid of each of said writing beams by regulating relative intensity of at least a subset of said sub-beams within each writing of said beams; and means for directing each of said writing beams toward the photosensitive surface.

2. A system as in claim 1, wherein the directing means includes a multi-facet mirror disposed in the path of the writing beams.

3. A system as in claim 1 wherein the focusing distance for every writing beam between the creating means and the photosensitive surface is substantially equal.

4. A system as in claim 1, further comprising scanning means for causing each writing beam to move relative to the photosensitive surface in a scan path.

5. A system as in claim 4, further comprising a cylindrical lens extending along the scan path of the writing beam adjacent the photosensitive surface.

6. A system as in claim 4, wherein the scanning means includes a rotating polygonal mirror disposed in the path of the writing beams.

7. A system as in claim 4, wherein the sub-beams associated with each writing beam are arranged in a direction along the scan path of the writing beam.

8. A system as in claim 4, wherein the sub-beams associated with each writing beam are arranged in a direction perpendicular to the scan path of the writing beam.

9. A system as in claim 6, further comprising means for creating a pilot beam directed at a substantially identical spot on the rotating polygon as the writing beam with the pilot beam and the writing beam impinging substantially simultaneously on the rotating polygon.

10. A system as in claim 9, further comprising
    a test area substantially adjacent the photosensitive surface associated with the writing beam; and
    means for directing the pilot beam to the test area.

11. A system as in claim 10, wherein the test area includes an optical pattern, adapted to create a repetitive optical effect when the pilot beam is directed thereon and caused to move relative thereto.

12. A system as in claim 10, wherein the test area is defined on a member associated with a cylindrical lens, the cylindrical lens extending along the scan path of the writing beam directed toward the photosensitive surface.

13. A system as in claim 10, further comprising receptor means for detecting the repetitive optical effect when the pilot beam is directed on and moves relative to the optical pattern.

14. A system as in claim 5, wherein the photosensitive surface comprises a plurality of photoreceptor drums, with the longitudinal axis of each drum being disposed along the scan path of one of the writing beams.

15. A system as in claim 14, wherein each photoreceptor drum has associated therewith development means, each development means being adapted to develop an electrostatic latent image in a different color.

16. A system as in claim 15, further comprising an intermediate belt for accepting toner associated with developed images transferred from the photosensitive drums.

17. A system as in claim 1, wherein the photosensitive surface comprises a single continuous photosensitive member.

18. A system as in claim 17, further comprising development means disposed along the continuous photosensitive member.

19. A system as in claim 18, wherein each development means is adapted to develop an electrostatic latent image in a different color.

20. A system as in claim 17, further comprising means, responsive to the receptor means, for sensing anomalies in the motion of the writing beam in the scan path, based on anomalies in the repetitive optical effect of the pilot beam moving relative to the optical pattern.

21. A system as in claim 20, further comprising means for controlling the modulation of the writing beam in response to the sensed anomalies.

22. A system as in claim 20, further comprising means for adjusting the position of the centroid of the writing beam in response to the sensed anomalies.

23. A system as in claim 22, wherein the means for adjusting the position of the centroid of the writing beam includes means for adjusting the relative intensity of at least one of the sub-beams in the writing beam.

* * * * *